United States Patent Office 3,049,414
Patented Aug. 14, 1962

3,049,414
COLOR-STABLE GASOLINE
Piet Cornelis Kruyff, P.O. Box 226, Casa Roig,
Yauco, Puerto Rico
No Drawing. Filed July 15, 1959, Ser. No. 827,153
7 Claims. (Cl. 44—63)

This invention relates to a process for stabilizing the color of gasoline. In particular, it relates to a process for stabilizing the color of gasoline prepared by cracking.

Modern oil technology attempts to get a maximum yield of gasoline from the crude oil. Among the well established methods of increasing the yield of gasoline is the process known as "cracking" in which non-gasoline components are converted into products constituting gasoline. The forms of "cracking" to enhance gasoline yield from crude oil are varied including in particular thermal cracking, catalytic cracking, thermal coking, fluid coking and the like. The forms of cracking to modify gasolines and napthas into gasolines of more desirable qualities include thermal reforming and vapor phase cracking. These techniques of cracking increase very substantially the yield or quality of gasoline that can be obtained from crude oil. However, these processes suffer from various deficiencies. In particular, the resultant cracked gasolines have poor gum stability and poor color stability.

Gum stability has been increased by the use of so-called gum inhibitors or gum treatment. These gum treatments have varied widely including, for example, use of strong sulfuric acid, absorption with clay and metal-deactivation. With the improvement in gum stability, color stability has not necessarily been improved. With many gum inhibitors, the improvement of color stability is negligible, with the result that the color of freshly distilled gasoline, even though gum-stabilized, can deteriorate in a few days or a few weeks to a heavy yellow or even a brown. Color degradation is important commercially since it prevents the use of dyes which are important in identifying grade and/or quality of a gasoline. Thus, military specifications for aviation gasoline of different octane number prescribe color. Some oil companies wish to distinguish their products from all others by color. Color-unstable gasolines containing such dyes mask the dyes or react with them so that they cannot be identified.

No economical processes have been developed to eliminate the color degradation. Certain refining processes which help improve color stability do so at too high a product loss or cost. Also, the problem of color stability is more severe with catalytically cracked gasoline than with thermally cracked gasoline for a given crude oil.

One object of this invention is to provide an economically feasible method for improving the color stability of gasoline. Other objects and advantages of this invention will become apparent from the specification and claims which follow.

This invention comprises in its general form, the steps of washing the gasoline with a liquid characterized as being free of heavy metals and capable of dissolving pyridine; washing with alkaline aqueous solution, characterized as being free of heavy metals; removing substantially all the free alkali; and then adding an organic nitrogenous base, all of whose carbon-carbon bonds are saturated. The first washing is preferably carried on until the original nitrogen base content is less than 0.01%. The alkaline wash is preferably carried on until the total phenols and thio-phenols content is less than 0.01%. Such phenols include, for example, mono-hydroxyphenols, di-hydroxyphenols, tri-hydroxyphenols, and polyphenols. The removal of the residual free alkali can be effected by phase separation or by mechanical or electrical means. One method is to use a hydrocyclone. (A hydrocyclone is a term used to describe a cyclone designed to handle liquids with suspended matter. One common commercial type (Dorr-Oliver) separates a dilute slurry into a solid-free top stream and a thickened concentrated bottom slurry.) Another is to use electrophoresis. Liquids which can be used in the first washing step include, but are not limited to: water, aqueous mineral acid, liquid sulfur dioxide, liquid hydrofluoric acid, dimethysulfoxide and furfural. The choice of liquid will be determined by the nature amount and distribution of the original nitrogen bases. The term "heavy metals" is intended to mean metals in groups IIIB, IVB, VB, VIB, VIII, IB, IIB, IIIA, IVA, VA, VIA, and rare-earth metals, either as ions, metal, salts or oxide. Such heavy metals includes for example chromium, iron, manganese, cobalt, nickel, copper, etc. "Light metals" of group IA are permissible and include Li, Na, K, Rb and Cs. "Light metals" of group IIA are permissible, but undesirable. The group designations refer to the periodic table published in "Handbook of Chemistry and Physics," 4th edition, 1940, Chem. Rubber Publishing Co., page 346. The term, "free of" is used in the conventional sense of including materials completely free of the ingredient, good to excellent grades substantially free of the ingredient, and those having trace amounts of the ingredients.

Examples of saturated nitrogenous organic bases which can be used in this invention include, but are not limited to N-heterocyclic amines such as morpholine, N-alkyl morpholine (e.g. N-methyl morpholine, N-ethyl morpholine), piperazine, N-alkyl piperazines (e.g. 2,5 dimethyl piperazine), aliphatic polyamines (e.g. triethylene tetramine, propylene diamine) and naphthenic amines (e.g. menthane diamine and cyclohexylamine). The amount of saturated base to be added can be varied but a range of 0.005 to 0.02% gives especially satisfactory results. The preferred final product of this invention has a maximum nitrogen content of 0.02% before adding gum inhibitor including at least 0.005% of the base, and has a maximum phenols-thiophenols content of 0.01%.

In carrying out the steps of this invention, either normal refining or treating steps which are of a different nature can be interspersed. Thus, if the gasoline is separated from the other cracking products in a main fractionator an adequate amount of water should be added to that already in the vapor line, together with corrosion inhibitors. Also, hydrogen sulfide removal, mercaptan removal, "sweetening" and the like can be combined with the alkaline wash in a conventional manner. A specific example of this invention is described below:

From a Venezuelan crude oil with a total nitrogen content of over 0.5% a straight run vacuum distillate was prepared with a boiling range between 450° and approximately 1400° F. The distillate was subjected to catalytic cracking under the following conditions: Cracking temperature 940° F.; cat/oil ratio 4.0; recycle ratio 1.5; space rate 2.0; conversion 80%. The cracking products were fractionated in a main fractionator yielding an unstabilized gasoline cut with an end point of 435° F. Metal corrosion inhibitor was added in the vapor line and the pH of the condensing water kept just over 7.0. The gasoline cut was stabilized to adjust the vapor-pressure to a value between 4.5 and 7.5 Reid vapor pressure.

The stabilized gasoline was then treated by washing with 10% aqueous sulfuric acid characterized as being free of heavy metals in one theoretical stage to yield a treated gasoline with a total nitrogen content of less than 0.01%.

The gasoline was then sweetened and treated further as follows: hydrogen sulphide, phenols, alkyl phenols, polyphenols, thiophenols and their homologues were removed by washing with 10% caustic soda solution characterized as being substantially free of heavy metals (e.g. iron, nickel, chromium, manganese) in three theoretical stages, and then with 20% caustic soda solution characterized as being substantially free of heavy metals (e.g. iron, nickel, chromium, manganese) in a minimum of two theoretical stages to ensure a total phenols and thiophenols concentration in the treated gasoline of less than 0.01%.

Mercaptan "sweetening" (i.e. removal of mercaptan or conversion to disulfide) was then done by the conventional air-caustic-inhibitor process, using a phenylene diamine type inhibitor (e.g. N,N di-secondary butyl-paraphenylene diamine) as the catalyst in the gasoline on its way to the run-down tank. The "sweetened" gasoline was allowed to remain in the run-down tank till completion of the sweetening reaction and for settling of the entrained caustic.

During transfer to the final storage tank, the residual caustic was removed by using a hydro-cyclone. Then .01% morpholine was added. Additional phenylenediamine type gum-stabilizer was added simultaneously. The color of the finished gasoline on entering the tank was 21 Saybolt; after one month storage color was 19 Saybolt.

It is obvious that various modifications may be made in the method and compounds of the present invention without departing from the spirit and scope thereof.

I claim:

1. A process for stabilizing the color of gasoline, said gasoline comprising gasoline prepared by catalytic cracking; comprising washing said gasoline with a first liquid capable of dissolving pyridine selected from the group consisting of water, aqueous mineral acid, liquid sulfur dioxide, liquid hydrofluoric acid, dimethyl sulfoxide and furfural, said first liquid being substantially free of members selected from the group consisting of the metals in groups IIIB, IVB, VB, VIB, VIII, IB, IIB, IIIA, IVA, VA, and VIA; then washing said gasoline with a second liquid comprising an alkaline aqueous solution, said second liquid being substantially free of members selected from the group consisting of the metals in groups IIIB, IVB, VB, VIB, VIII, IB, IIB, IIIA, IVA, VA, VIA; then removing substantially all of the free alkali; and then adding a nitrogenous organic base, all of whose carbon-carbon bonds are saturated, to said gasoline as a stabilizer.

2. The process of claim 1 wherin the nitrogenous base is selected from the group consisting of aliphatic polyamines, naphthenic amines and N-heterocyclic amines.

3. The process of claim 1 wherein the washing with said first liquid is carried out until the original nitrogenous base content of the gasoline is less than 0.01% and the washing with said second liquid is carried out until the original total phenol and thiphenol content of the gasoline is less than 0.01%.

4. A process for stabilizing the color of gasoline prepared by catalytic cracking comprising washing said gasoline with a 10% aqueous solution of sulfuric acid, said acid being substantially free of members selected from the group consisting of the metals in groups IIIB, IVB, VB, VIII, IB, IIB, IIIA, IVA, VA and VIA; then washing said gasoline with an equeous solution of caustic soda, said caustic soda solution being substantially free of members selected from the group consisting of the metals in groups IIIB, IVB, VB, VIB, VIII, IB, IIB, IIIA, IVA, VA and VIA; then removing substantially all of the free caustic; and then adding morpholine and phenylene diamine to said gasoline as a stabilizer.

5. The process of claim 4 wherein the washing with sulfuric acid is carried out until the original nitrogenous base content of the gasoline is less than 0.01% and the washing with caustic is carried out until the original total phenol and thiophenol content of the gasoline is less than 0.01%.

6. A color stable gasoline produced according to the process of claim 1.

7. A color stable gasoline produced according to the process of claim 4.

References Cited in the file of this patent

UNITED STATES PATENTS

| 2,062,201 | Bartram | Nov. 24, 1936 |
| 2,071,064 | Downing et al. | Feb. 16, 1937 |

OTHER REFERENCES

Kalichevsky: Chemical Refining of Petroleum, Reinhold Publishing Corp., New York (1942), chap. X (pages 386 and 395, only relied on).